Patented Jan. 2, 1940

2,185,451

UNITED STATES PATENT OFFICE 2,185,451

FOOD PRODUCT

Byron H. Webb, Washington, D. C.; dedicated to the free use of the People in the territory of the United States No Drawing. Application December 27, 1938, Serial No. 247,989

4 Claims. (Cl. 99—207)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This specification describes a new use for skim milk, whey or buttermilk combined with cooked potatoes. I have discovered that an attractive and highly nutritive human food can be cheaply made from these milk by-products and potatoes.

Milk and potatoes are two of the nation's basic foods. Skim milk and whey are by-products of the dairy industry for which new uses are needed. Potato growers have been seeking new outlets for their surplus potatoes, particularly the smaller or second grade ones. My discovery provides a way to utilize these surpluses by converting them into a new food product.

My new product consists essentially of boiled, mashed potato to which is added salt, sometimes other flavoring, and a form of milk by-product. The mixture is whipped until its volume is almost doubled and the whip is dried in a hot air or vacuum drier.

A light porous texture is an essential feature of my new product. A solid textured product would be hard and unpalatable. I have discovered that by whipping in air and subsequently drying my milk-potato mixture an attractive, light texture can be obtained without the addition of baking soda or other gas forming material.

No fat is present in my new product. It will therefore keep well for long periods of time. There is no danger of the development of off flavors due to chemical changes in fat, nor is there a packaging problem, such as is encountered in potato chips. A flavoring material containing a form of fat which will keep, such as filled cheese, may however be sprayed on my finished product.

Milk solids function as a whipping aid as well as acting as an important addition to the flavor and nutritive properties of the new product. Mixtures of boiled potato and water increase in volume only slightly when whipped. When milk-solids-not-fat are added to the potato-water mixture, excellent whipping properties result. Whey solids are capable of producing a better whip than skim-milk solids. However, the finished skim milk-potato product is superior in strength and breaking resistance to the more fragile whey product.

Condensed or dry skim milk, buttermilk, or whey are suitable milk products. If dry milk products are used, water is added to produce a heavy mushy mixture. Wide variations in the ratio of potato to milk solids are possible. My process can be carried out satisfactorily and a good product obtained when the range of ingredients is varied on a solids basis as follows:

| | Per cent |
|---|---|
| Potato solids | 50 to 85 |
| Milk-solids-not-fat | 5 to 48 |
| Salt | 2 to 10 |

When the milk solids are lower than 5 per cent, very low overruns are obtained during whipping. If more than 50 per cent milk solids are used, the finished dry product has a tendency to become hard and horny.

Milk solids, especially casein, make an important contribution to the flavor of my new product. The casein added in the skim milk imparts a slight cheese flavor. If skim milk or whey is used in which a bacterial culture has produced a special flavor, this particular flavor appears in the finished product.

Any form of white potato is suitable as a material for use in my product, and cheap low-grade potatoes can be utilized. The potatoes are boiled in water until soft, the skins removed, and the potatoes then broken up or put through a ricer.

Salt may be added to suit the taste, and wide limits in concentration are permissible. Other flavoring material, such as cheese or vegetable extracts, or pulped vegetables, may be added to the milk-potato base.

The viscous milk-potato mixture is whipped to any desired overrun. When a whip of more than 100 per cent overrun is dried, a very light porous and fragile product is obtained. The optimum overrun has been found to lie between 65 and 100 per cent.

The whipped material is dried in any convenient manner, such as vacuum drying, or hot air tunnel drying. Sticks dry in a hot air tunnel more quickly than larger pieces, such as sheets of material or wafers. Drying is most rapid when the whipped mixture is extruded on gauze or screening, where drying may occur on all surfaces. I have discovered aluminum screening to be the most satisfactory surface upon which to dry this mixture. However, aluminum or Monel metal trays are also suitable. Sticks of milk-potato mixture about ¼-inch in diameter will dry on an aluminum screen when subjected to a constant flow of hot air in about one hour at 130° C., or in about 10 hours at 70° C.

When my new product is dry, I toast it under a direct gas flame. This treatment produces an attractive brown color, which develops quickly, because of the presence of milk sugar and milk protein.

Although wide variations in the quantities of ingredients and in the manufacturing steps are possible, the following example illustrates the method of manufacture and shows the composition of a typical product:

Twenty-nine hundred grams of freshly boiled and peeled potato is passed through a ricer. To this is added 800 grams of water, 270 grams of spray-dried skim milk (or 1070 grams of 24 per cent condensed skim milk), and 60 grams of salt. The mixture is whipped for about 3 to 5 minutes, or until 70 to 80 per cent overrun is obtained. The whip is extruded through an orifice to form any desired figure, such as sticks or pretzels. Trays of aluminum screening receive the forms as they are extruded. These trays are placed in a drying tunnel through which dry air at 130° C. is circulated. The drying period is one hour. After drying, the potato sticks are toasted until a light brown color develops on the surface. The finished product is now ready for packaging.

Having thus described my invention what I claim for Letters Patent is:

1. A process for the preparation of a milk solids-potato product containing from 50 to 85 per cent potato solids, from 5 to 48 per cent skim milk solids, and from 2 to 10 per cent salt, consisting in whipping air into a mixture of boiled potato, skim milk solids, salt, and water, dehydrating the whipped mixture, and toasting the dry product.

2. A process for the preparation of a milk solids-potato product containing from 50 to 85 per cent potato solids, from 5 to 48 per cent whey solids and from 2 to 10 per cent salt, consisting in whipping air into a mixture of boiled potato, whey solids, salt, and water, dehydrating the whipped mixture, and toasting the dry product.

3. A process for the preparation of a milk solids-potato product containing from 50 to 85 per cent potato solids, from 5 to 48 per cent buttermilk solids, and from 2 to 10 per cent salt, consisting in whipping air into a mixture of boiled potato, buttermilk solids, salt, and water, dehydrating the whipped mixture, and toasting the dry product.

4. A process for the preparation of a milk solids-potato product containing from 50 to 85 per cent potato solids, from 5 to 48 per cent non-fat milk solids product, and from 2 to 10 per cent salt, consisting in whipping air into a mixture of boiled potato, non-fat milk solids product, salt and water, dehydrating the whipped mixture and toasting the product.

BYRON H. WEBB.